United States Patent Office 2,733,988
Patented Feb. 7, 1956

2,733,988
ALIPHATIC SUBSTITUTED METHYL UREA HERBICIDAL COMPOSITIONS AND METHODS

Norman E. Searle, Wilmington, Del., assignor to E. I. du Pont de Nemours and Company, Wilmington, Del., a corporation of Delaware No Drawing. Application November 19, 1954, Serial No. 470,121

5 Claims. (Cl. 71—2.7)

This invention relates to herbicidal compositions and methods employing as an essential active ingredient one or more polysubstituted ureas represented by the formula (1) 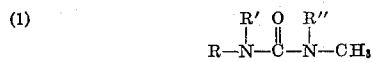

where R is an acyclic aliphatic radical containing from 2 to 6 carbon atoms inclusive, R' is hydrogen or methyl, and R" is hydrogen or aliphatic hydrocarbon radical of 1 to 4 carbon atoms inclusive, with the proviso that at least one of R' and R" is hydrogen.

Stated in another way, the compounds employed in the compositions and methods of the invention are those represented by the formulas (2) 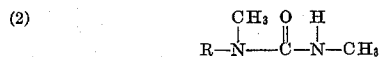

and (3) 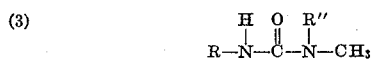

where R and R" have the same significance as stated above.

Illustrative of the polysubstituted ureas employed in the compositions and methods of the invention are:

3-n-butyl-1,1-dimethylurea
3-n-butyl-1-methyl-1-ethylurea
3-n-butyl-1-methyl-1-m-propylurea
3-n-butyl-1-methyl-1-n-butylurea
3-n-propyl-1,1-dimethylurea
3-(2-cyanoethyl)-1,1-dimethylurea
3-(2-ethoxyethyl)-1,1-dimethylurea
3-(3-chloro-n-propyl)-1,1-dimethylurea
3-hexyl-1,1-dimethylurea
3-amyl-1,1-dimethylurea
3-hexyl-1-methyl-1-n-butylurea
3-allyl-1,1-dimethylurea
3-n-butyl-1-allyl-1-methylurea
3-butyl-1-methylurea The most preferred compounds are those of Formula 3 above in which R" is methyl and R is alkyl of 2 to 6 carbon atoms; in other words, the 3-(alkyl)-1,1-dimethylureas wherein said alkyl radical contains 2 to 6 carbon atoms.

The di- and tri-substituted ureas employed in the compositions and methods of the invention are readily prepared by reacting an appropriate isocyanate with an appropriate amine. The reactions are most readily carried out in the presence of an inert solvent such as anisole or toluene at elevated temperatures.

The herbicidal compositions of the invention are prepared by admixing one or more of the substituted ureas with a carrier material or conditioning agent of the kind used and referred to in the art as a pest control adjuvant or modifier in order to provide formulations adapted for ready and efficient application to soil, weeds, or unwanted plants using conventional applicator equipment.

Thus the substituted urea material is admixed with carrier or adjuvant materials to provide formulations in liquid or solid form. Solid compositions are preferably in the form of dusts and are compounded to give homogeneous free-flowing dusts by admixing the active compound with finely divided solids preferably talcs, natural clays, pyrophyllite, diatomaceous earth, and flours such as walnut shell, wheat, redwood, soya bean, cottonseed flours, and other inert solid carriers of the kind conventionally employed in preparing pest control compositions and dusts or powdered form.

Liquid compositions employing the active ingredients are prepared in the usual way by admixing the active ingredient with a conventional liquid diluent media. The substituted ureas are quite insoluble in most liquids altho solutions containing them at low concentration can be made if desired using various of the common organic solvents such as cyclohexanol, acetone, ethanol, isobutanol, furfural, isopropyl acetate, and the like. More preferably, the liquid compositions are prepared in more concentrated form so that the liquid composition is primarily a suspension of the active compound in the liquid. In preparing such compositions conventional spray oils, alkylated naphthalene, or fats, or similar vehicles such as cotton seed oil, olive oil, lard, paraffin oil, hydrogenated vegetable oil and similar conventional organic liquid diluents are suitably employed.

The herbicidal compositions of the invention whether in the form of dusts or liquids preferably also include a surface active dispersing agent of the kind sometimes referred to in the art as wetting, dispersing and emulsifying agents.

The surface active dispersing agents employed can be of the anionic, cationic, or nonionic type and include, for example, sodium oleate, sulfonated petroleum oils, sodium lauryl sulfate, polyethylene oxides, and other surface active dispersing agents such as those listed in detail in articles by McCutcheon in Soap and Sanitary Chemicals, August, September, and October of 1949.

The amount of surface active dispersing agent employed in compositions of the invention will vary depending upon the effectiveness of the particular surface active dispersing agent employed and the properties of other materials in the composition. Generally, the surface active dispersing agent will not comprise more than about 10% by weight of the composition and with the better materials will be 5% or less.

The content of the active substituted urea or ureas employed in the herbicidal compositions of the invention will vary according to the manner in which and the purpose for which the composition is to be applied but in general will be from 0.5 to 95% by weight of the composition.

The herbicidal compositions are applied either as a spray or in the form of a dust to the locus or area to be protected from undesirable plant growth. The substituted urea is, of course, applied in amount sufficient to exert the desired plant killing action. The application can be made directly upon the locus or area during the period of infestation of unwanted plant growth or alternatively the application can be made in advance of an anticipated infestation.

Fertilizer materials, other herbicidal agents, and other pest control agents such as insecticides and fungicides can be included in the herbicidal compositions of the invention if desired.

In order that the invention may be better understood, the following examples are given in addition to the examples already given above.

Example 1

9.3 parts by weight of dimethylamine was added with stirring to 20 parts by weight of n-butyl isocyanate in 100 parts by weight of toluene. The mixture was then stirred and heated for 30 minutes at the reflux temperature.

After the heating period the toluene was removed by distillation under reduced pressure leaving an oil residue. This residue was purified by distillation to give 22.3 parts by weight of 3-n-butyl-1,1-dimethylurea, B. P. 106–8° C. at 0.7 mm. hg.

*Analysis.*—Calc'd. for $C_{17}H_{16}N_2O$: C, 58.33; H, 11.21. Found: C, 58.04; H, 11.30.

The compound prepared above is formulated as a water dispersible powder by mixing and grinding it with conditioning agents of the kind, and in the proportions by weight, shown below.

3-n-butyl-1,1-dimethylurea _____ 35
Bentonite _____ 5
Fuller's earth _____ 60

An application at a rate of 3 pounds per acre of the substituted urea of this example to an area planted with corn and cotton controlled weed seedlings without damage to the corn or the cotton.

Example 2

3-n-propyl-1,1-dimethylurea is admixed with 5% by weight of a proprietary wetting, dispersing, and emulsifying agent having as its effective ingredient diethyl cyclohexylamine dodecyl sulfate.

The emulsifiable oil concentrate of this example is readily dispersible in water to obtain aqueous spray compositions which are effective in application for the control of unwanted plants.

Example 3

A herbicidal dust is prepared by admixing 3-n-butyl-1-methyl-1-n-propylurea with talc in the proportion of about 32 parts by weight of talc for each part by weight of the tri-substituted urea.

The dust composition of this example is free flowing and is easily broadcast over an area to be protected from weeds.

This application is a continuation-in-part of my co-pending application Serial No. 385,892, filed October 13, 1953.

While the invention has been illustrated in the detailed examples with reference to specific compounds, it will be understood that other substituted ureas of the class described herein can be similarly employed as the description herein has been given for clearness of understanding only and no unnecessary limitations are to be understood therefrom. The invention is not limited to the exact details shown and described for obvious modifications will occur to those skilled in the art.

I claim:

1. A method for the control of weeds which comprises applying to a locus to be protected from the weeds, in amount sufficient to exert herbicidal action, a poly-substituted urea represented by the formula

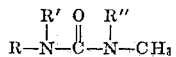

where R is an acyclic aliphatic radical containing from 2 to 6 carbon atoms inclusive, R' is selected from the group consisting of hydrogen and methyl, and R'' is selected from the group consisting of hydrogen and aliphatic hydrocarbon radical of 1 to 4 carbon atoms inclusive, with the proviso that at least one of R' and R'' is hydrogen.

2. A herbicidal composition comprising in herbicidal concentration in admixture with a surface-active dispersing agent, a poly-substituted urea, represented by the formula

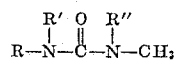

where R is an acyclic aliphatic radical containing from 2 to 6 carbon atoms inclusive, R' is selected from the group consisting of hydrogen and methyl, and R'' is selected from the group consisting of hydrogen and aliphatic hydrocarbon radical of 1 to 4 carbon atoms inclusive, with the proviso that at least one of R' and R'' is hydrogen.

3. A method for the control of weeds which comprises applying to a locus to be protected from weeds, in amount sufficient to exert herbicidal action, a 3-alkyl-1,1-dimethylurea wherein said alkyl contains from 2 to 6 carbon atoms inclusive.

4. A herbicidal composition comprising in herbicidal concentration in admixture with a surface-active dispersing agent a 3-alkyl-1,1-dimethylurea wherein said alkyl contains from 2 to 6 carbon atoms inclusive.

5. A herbicidal composition comprising 3-n-butyl-1,1-dimethylurea in herbicidal concentration in admixture with a surface-active dispersing agent.

References Cited in the file of this patent

UNITED STATES PATENTS 2,477,872    Haury _____ Aug. 2, 1949